(No Model.)
J. P. MANNY.
LEMON JUICE EXTRACTOR.
No. 415,049. Patented Nov. 12, 1889.
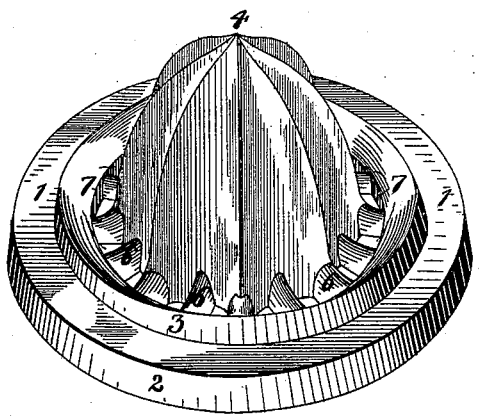
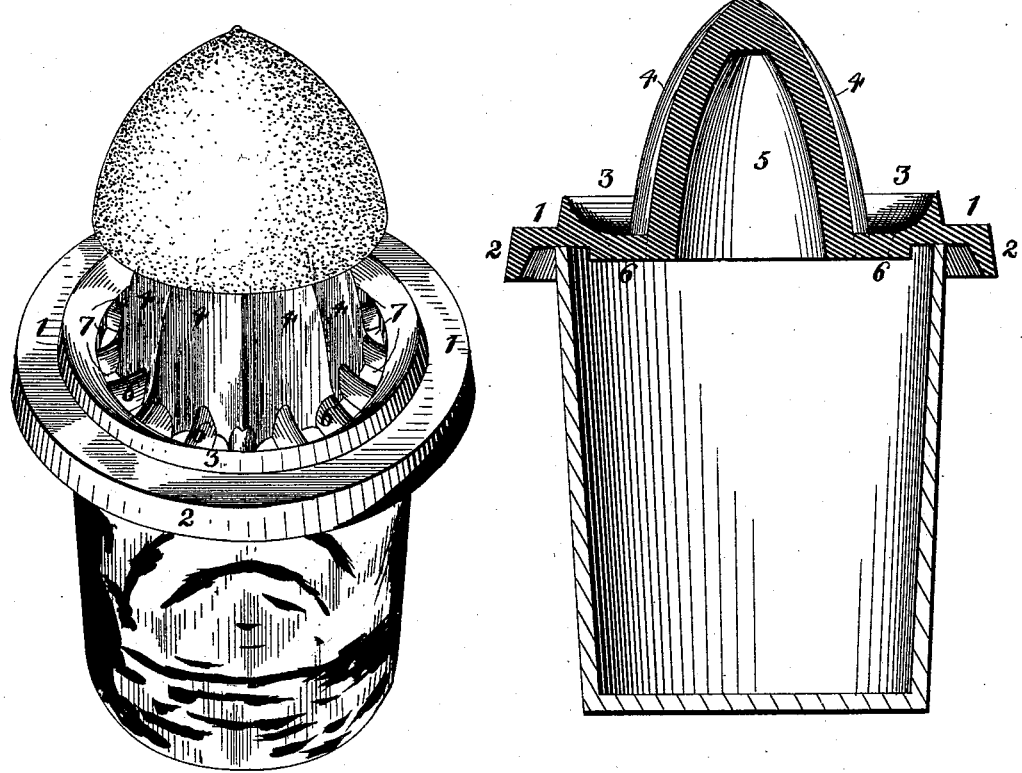
Witnesses:
E. Behel.
W. R. Johns
Inventor:
John P. Manny.
By A. O. Behel,
Atty.

UNITED STATES PATENT OFFICE.

JOHN P. MANNY, OF ROCKFORD, ILLINOIS.

LEMON-JUICE EXTRACTOR.

SPECIFICATION forming part of Letters Patent No. 415,049, dated November 12, 1889.

Original application filed November 19, 1888, Serial No. 291,191. Divided and this application filed October 4, 1889. Serial No. 325,973. (No model.)

*To all whom it may concern:*

Be it known that I, JOHN P. MANNY, a citizen of the United States, residing at Rockford, in the county of Winnebago and State of Illinois, have invented certain new and useful Improvements in Lemon-Juice Extractors, of which the following is a specification.

The object of this invention is to construct a lemon-juice extractor provided with a base portion having a depending flange of a form to receive the open end of a suitable receptacle, said base having a portion of its bottom developed into and forming a part of the ribbed conical extractor, the conical extractor joined to the base by ribs, leaving a series of openings, through which the extracted juice will pass into the receptacle, the upper surface of the base being recessed to hold the pithy portion of the lemon.

Features herein shown and described but not claimed form the subject-matter of claims in my pending application, Serial No. 291,191, filed November 19, 1888, of which this application is a division.

In the accompanying drawings, Figure 1 is an isometrical representation of my improved lemon-juice extractor. Fig. 2 is an isometrical representation of a lemon-juice extractor, showing the manner in which it is used. Fig. 3 is a vertical central section of the extractor resting upon a receptacle.

The base portion 1 of my extractor is of circular form, having an annular flange 2, depending from its under side. This flange prevents the displacement of the extractor when placed upon a tumbler or other suitable receptacle. An annular rib 3, rising from the upper surface of the base portion, forms a recess for holding the pithy portion of the lemon and seeds from which the juice has been extracted.

The extractor proper rises from the upper surface of the base, and is of conical, or, preferably, as shown, of hyperbolic outline in form, and consists of projections 4, extending outwardly from its face, leaving depressions between the projections. The conical extractor is formed hollow by developing a portion of the base into the extractor, as shown at 5, Fig. 3. This extractor is connected to its base at proper intervals by ribs 6. Openings 7 between the ribs 6 permits the passage of the extracted juice into a receptacle placed beneath the extractor, as shown in the accompanying drawings. Each alternate rib 6 forms a continuation of one of the projections 4 on the face of the extractor.

In use I cut a lemon transverse to its lengthwise axis about the center thereof, and press one-half onto the extractor and oscillate it thereon, which extracts the juice from the fruit. The many projections of the extractor will necessitate but a slight oscillation of the lemon in order to extract the juice.

By this construction of a lemon-juice extractor of a single piece of material I produce a simple and efficient means of extracting all the juice from the lemon or other similar fruit without extracting the oil of the rind or other objectionable substance, and the ribs connecting the extractor with its base serve as a strainer to separate the juice from the pithy portion and seeds of the fruit, and act as wipers to free the lower edge of the half-lemon from juicy pulp when brought into engagement therewith, and the cup-shaped recessed upper portion will hold and prevent the overflow of the objectionable substance.

By experience I have demonstrated that glass is the best material from which to manufacture my improved lemon-juice extractor, owing to its non-corroding quality and cheapness of construction.

I claim as my invention—

1. A lemon-juice extractor comprising a conoidal portion having juice-releasing projections on its surface and ribs extending from the conoidal portion with juice-exit openings between them, substantially as set forth.

2. A lemon-juice extractor comprising a conoidal portion provided with sharpened projections, and ribs extending outwardly from the conoidal portion and forming a prolongation of some of the projections, substantially as set forth.

3. A lemon-juice extractor comprising a conoidal portion provided with juice-releasing projections, and an annular base portion connected with the conoidal portion by ribs having juice-exit openings between them, substantially as set forth.

JOHN P. MANNY.

Witnesses:
  A. O. BEHEL,
  E. BEHEL.